June 2, 1931.                G. M. MORTENSON                1,808,059
                                  CLAMP
                           Filed March 13, 1930
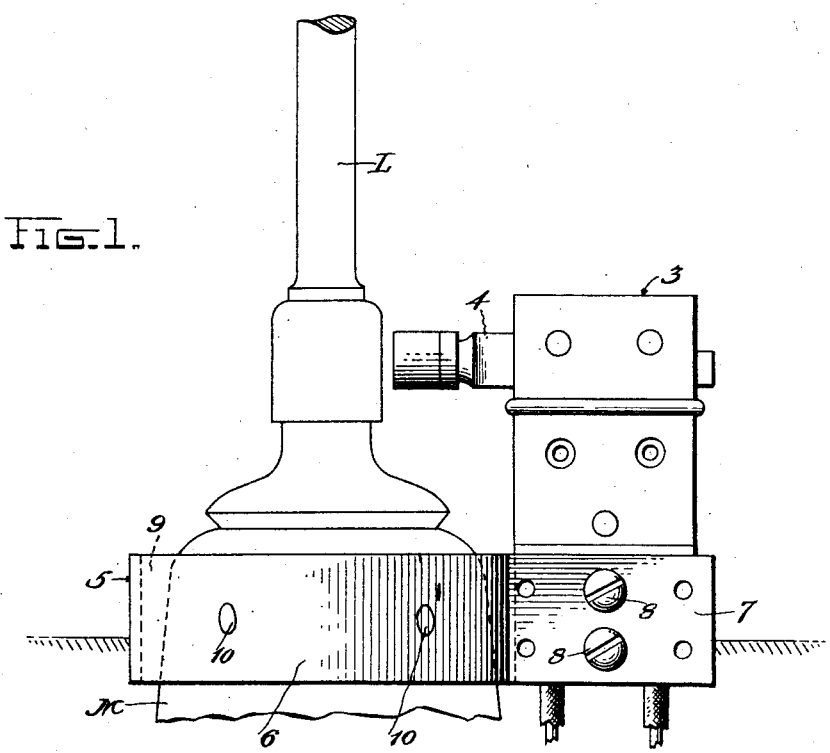
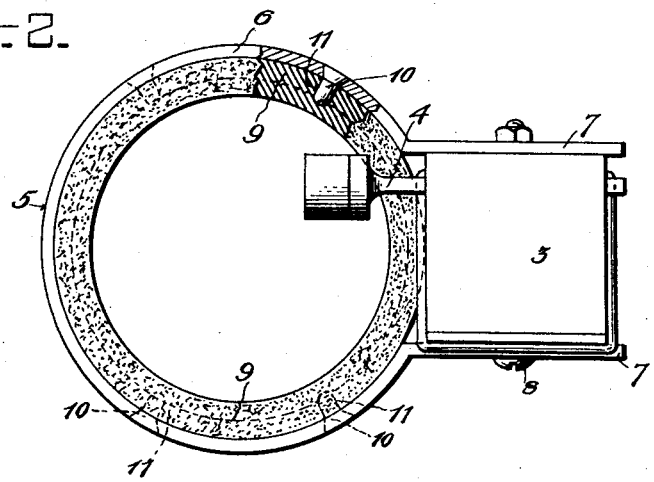
Witness
C. E. Hunt.
Inventor
Gustav M. Mortenson
By H. B. Willson &Co
                    Attorneys Patented June 2, 1931

1,808,059

UNITED STATES PATENT OFFICE

GUSTAV M. MORTENSON, OF KANE, PENNSYLVANIA

CLAMP

Original application filed April 8, 1929, Serial No. 353,537. Divided and this application filed March 13, 1930. Serial No. 435,515.

This application is a division of my parent U. S. application, Serial No. 353,537, filed April 8, 1929. This parent application is devoted to a novel switch for action by the usual gear shift lever of an automobile for the purpose of bringing a backing light into and out of operation, and the present application involves only a clamp by means of which the switch is mounted.

Upwardly tapered mounts are commonly employed for gear shift levers, and it is with these mounts that I intend to connect the switch, the object of the invention being to provide a simple and inexpensive form of clamp whose interior is formed of elastic material and is hence self-adapting to any particular taper which the gear lever mount may possess.

With the foregoing in view, the invention resides in the novel subject matter hereinafter described and claimed, description being accomplished by reference to the accompanying drawings.

Fig. 1 is a side elevation.

Fig 2 is a top plan view of the switch and the clamp removed from the gear lever mount.

In the drawings above briefly described, the numeral 3 denotes a switch having an operating portion 4 positioned to be struck by the conventional gear shift lever L of an automobile, when the latter is moved into reverse position, said lever being supported by the usual upwardly tapered mount M. The improved clamp is denoted at 5 for connecting the switch 3 with the mount M.

The clamp 5 embodies, in its preferred construction, a transversely split contractible metal band 6 having outwardly projecting arms 7 at its ends, said arms having openings through which bolts 8 pass, said bolts being operative to contract the band 6 about the mount M. In order that the clamp may adapt itself to any taper which the mount M may possess, I provide said band with a rather thick lining 9 of rubber or other appropriate deformable material. This lining may be connected with the band 6 in any desired way, but I preferably provide said band with inwardly projecting studs 10 whose length is less than the thickness of the lining, said studs being received in sockets 11 in said lining. In the present showing, the lining is continuous, although this is not essential.

By loosening the bolts 8, positioning the clamp around the mount M with its lining 9 snugly engaging the latter, and then tightening said bolts, the lining will be tightly engaged with said mount and will adapt itself, due to its resilient nature, to any degree of taper which the mount may possess. Hence, the necessity of providing various clamps with different degrees of taper is overcome. Moreover, a clamp having one internal diameter, may be successfully used upon mounts somewhat larger than that for which the clamp was originally intended, as the lining will compress or deform and permit such use.

It will be seen from the foregoing that exceptionally simple and inexpensive, yet efficient and desirable provision has been made for carrying out the object of the invention, and while the details disclosed are preferably followed, attention is invited to the fact that within the scope of the invention as claimed, minor variations may be made.

I claim:

A clamp adapted to surround a tapered member, said clamp being provided with a thick resilient lining to adapt itself to any degree of taper which said member may possess, said clamp being provided with inwardly projecting studs of a length less than the thickness of the lining, the latter having sockets in which said studs are received.

In testimony whereof I have hereunto affixed my signature.

GUSTAV M. MORTENSON.